Figure 1:
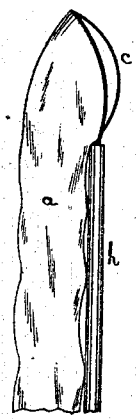

W. F. TOWNS.
Fruit-Gatherers.

No. 146,151.      Patented Jan. 6, 1874.

UNITED STATES PATENT OFFICE.

WILLIAM F. TOWNS, OF RAVENNA, OHIO.

IMPROVEMENT IN FRUIT-GATHERERS.

Specification forming part of Letters Patent No. 146,151, dated January 6, 1874; application filed November 5, 1873.

*To all whom it may concern:*

Be it known that I, WILLIAM F. TOWNS, of Ravenna, in the county of Portage and State of Ohio, have invented certain Improvements in Machines for Gathering Fruit, of which the following is a specification:

This invention consists of a wire picker, curved, as hereinafter described, attached to a pole, and a cloth tube.

Figure 1 represents a view of the fruit-gatherer.

The cloth tube $a$ is used to convey the fruit down from the tree. It is open at the lower end. At the upper end it is attached to the picker $c$, so as to form an opening in the side to receive and pick the fruit. The picker $c$ is made of a single piece of spring-wire, in an elliptical form, both ends of the wire being fastened in the end of the handle or pole $h$. The picker is curved outward from the side on which the cloth tube is attached, in the form of an arc of a circle, the upper end being on a line, or nearly so, with the handle.

When the picker is made to inclose an apple or other fruit, it is either drawn down or pushed up, as may be most convenient, till the sides of the picker, near its end, take hold of the apple and pull it from the tree. The cloth tube should be made large or full at the upper end to allow space for the fruit, so that, when the picker is drawn down, its upper end will take hold of and pull off the fruit, which is then conveyed to the ground through the cloth tube.

By reason of the curved form of the picker, its center, where the opening is the widest, is always in plain sight of the operator, so that he can see when the picker is in the proper position to take hold of the fruit. The upper end of the picker opening in a different direction from the lower end, the operator is enabled to use the picker in different and difficult positions of the fruit by severing the fruit with the end of the picker which is best adapted to the position of the fruit.

The picker is made of spring-wire, so that it will readily yield if pressed against the branches of trees, and thereby save the cloth from injury; and in passing it between and among branches which are close to each other its sides will readily compress, and, when the pressure is removed, restore themselves to their proper shape. It may also be made of common wire, larger than spring-wire, so as not to spring, if preferred.

I claim—

The fruit-picker $c$, curved as described, in combination with the cloth tube $a$ and the handle $h$, substantially as and for the purposes set forth.

WILLIAM F. TOWNS.

Witnesses:
GEO. F. ROBINSON,
BRADFORD HOWLAND.